(12) United States Patent
Daniel

(10) Patent No.: US 6,321,646 B1
(45) Date of Patent: Nov. 27, 2001

(54) WET CLUTCH/BRAKE ADAPTED TO ACCESS PRESS LUBRICANT

(75) Inventor: Edward A. Daniel, Ft. Loramie, OH (US)

(73) Assignee: The Minster Machine Company, Minster, OH (US)

( * ) Notice: Subject to any disclaimer, the term of this patent is extended or adjusted under 35 U.S.C. 154(b) by 0 days.

(21) Appl. No.: 09/347,759

(22) Filed: Jul. 6, 1999

(51) Int. Cl.[7] .............................. B30B 15/10; B30B 15/12
(52) U.S. Cl. ...................... 100/282; 100/299; 192/113.34
(58) Field of Search .................................. 100/282, 280, 100/299; 72/429, 452.4, 450; 192/18 A, 70.12, 113.3, 113.34, 113.5

(56) References Cited

U.S. PATENT DOCUMENTS

| | | |
|---|---|---|
| 2,606,637 | 8/1952 | Davoust . |
| 2,888,115 | 5/1959 | Knittel . |
| 3,373,853 | 3/1968 | Aschauer . |
| 3,614,999 | * 10/1971 | Sommer .............................. 192/18 A |
| 3,713,517 | 1/1973 | Sommer . |
| 3,773,157 | 11/1973 | Koch, Jr. et al. . |
| 3,835,971 | 9/1974 | Spanke et al. . |
| 3,860,100 | 1/1975 | Spanke et al. . |
| 3,946,840 | 3/1976 | Sommer . |
| 4,051,933 | 10/1977 | Beneke et al. . |
| 4,122,926 | 10/1978 | Spanke et al. . |
| 4,135,611 | 1/1979 | Spanke . |
| 4,186,827 | 2/1980 | Spanke . |
| 4,562,907 | 1/1986 | Maeda . |
| 4,574,926 | 3/1986 | Bubak . |
| 4,693,350 | 9/1987 | Sommer . |
| 4,785,926 | 11/1988 | Matson . |
| 5,190,129 | 3/1993 | Sommer . |
| 5,194,057 | 3/1993 | Sommer . |
| 5,487,456 | 1/1996 | Sommer . |
| 5,564,333 | * 10/1996 | Palmer ................................. 100/282 |
| 5,697,862 | * 12/1997 | Sommer ............................. 192/18 A |
| 5,921,361 | * 7/1999 | Sommer ............................. 192/18 A |
| 5,988,326 | * 11/1999 | Sommer ........................... 192/113.34 |
| 6,095,298 | * 8/2000 | Burns et al. ..................... 192/113.34 |

FOREIGN PATENT DOCUMENTS 9-42340   * 2/1997   (JP) .

* cited by examiner

Primary Examiner—Stephen F. Gerrity
(74) Attorney, Agent, or Firm—Randall J. Knuth

(57) ABSTRACT

A mechanical press having a wet clutch/brake assembly. The wet clutch/brake assembly is cooled and lubricated using a recirculating flow of lubricant. The entire press acts as a heat sink for the recirculating lubricant and effectively cools and lubricates the clutch/brake assembly. The recirculating flow of lubricant can be formed from press lubricant.

16 Claims, 2 Drawing Sheets

WET CLUTCH/BRAKE ADAPTED TO ACCESS PRESS LUBRICANT

BACKGROUND OF THE INVENTION

1. Field of the Invention

The present invention relates to a mechanical press drive and particularly to a wet clutch/brake unit which utilizes a recirculating flow of press lubricant to access and lubricate the clutch/brake unit.

2. Description of the Related Art

Mechanical presses of the type performing stamping and drawing operations have a conventional configuration including a frame structure with a crown and a bed connected by uprights and a slide supported within the frame for reciprocating movement toward and away from the bed. A crankshaft rotatably disposed within the crown is arranged in driving connection with the slide using a connecting arm assembly. A flywheel assembly rotatably driven by the drive mechanism is selectively connectable with the crankshaft for driving rotation thereof, utilizing a clutch/brake combination to make the driving connection. Such mechanical presses are used in a wide variety of workpiece operations employing a large selection of die sets with the press machine varying substantially in size and available tonnage depending upon the intended use.

The primary apparatus for storing mechanical energy within a press is a flywheel. The flywheel is mounted on the crankshaft and mechanically connected to the press motor such that when the press motor is energized, the mass of the flywheel rotates continuously. The press drive motor replenishes the energy that is lost or transferred from the flywheel during press operations when the clutch engages the flywheel to translate rotary motion of the flywheel to the crankshaft. During engagement of the clutch, the flywheel drops in speed as the press driven parts are brought up to running speed.

Prior wet clutch/brake systems have been used in mechanical presses since they offer the advantage of little or no wear on the plates of the disc stacks and no brake fade. This provides a precise operation of the press and dramatically increases press run time.

Wet clutch/brake units known in the art are generally filled with oil and sealed, whereby no oil enters or leaves the unit unless it is manually removed at a service interval. In these configurations, the flywheel operates as a heat sink.

What is needed in the art is a wet clutch/brake combination which is open to allow a flow of recirculating lubricant to enter and exit the clutch/brake assembly and which provides a larger heat sink. What is additionally needed in the art is a wet clutch/brake combination which does not require an additional lubricant source in the press machine.

SUMMARY OF THE INVENTION

The present invention is directed to improve upon the aforementioned wet clutch/brake assemblies, wherein it is desired to provide a wet clutch/brake assembly which is open to allow a recirculating flow of lubricant to access the clutch/brake assembly and which provides a significant heat sink to cool the recirculating lubricant.

The present invention provides a wet clutch/brake assembly for a mechanical press which is open to allow a recirculating flow of lubricant to access the clutch/brake assembly and which utilizes press lubricant as the recirculating lubricant in the wet clutch/brake assembly.

The invention, in one form thereof, comprises a mechanical press which has press lubricant and which includes a drive mechanism which drives a flywheel. The mechanical press further includes a quill which is non-rotatably connected to the press and which rotatably supports the flywheel. A first bronze bushing is connected to the press and rotatably supports the press driveshaft. A clutch/brake unit is supplied and selectively applies a braking action to the driveshaft and selectively couples the flywheel and the driveshaft in driving relationship. The clutch/brake unit is operatively connected to the press and is open to allow a recirculating flow of lubricant to access the clutch/brake unit. The recirculating flow of lubricant supplied to the clutch/brake unit may be press lubricant or lubricant from a secondary lubrication source.

The invention, in another form thereof, comprises a mechanical press which includes a clutch/brake unit for selectively applying a braking action to the press driveshaft and for selectively coupling the press flywheel and the press driveshaft in driving relationship. The clutch/brake unit is operatively connected to the press and is open to allow a recirculating flow of lubricant to access the clutch/brake unit. The recirculating flow of lubricant comprises press lubricant.

The invention, in another form thereof, comprises a mechanical press which includes a drive mechanism and a quill which is non-rotatably connected to the press. A flywheel is rotatably supported by the quill and is driven by the drive mechanism. A first bronze bushing is connected to the press and a driveshaft is rotatably supported by the first bronze bushing. A clutch/brake unit is provided and selectively applies a braking action to the driveshaft and selectively couples the flywheel and the driveshaft in driving relationship. The clutch/brake unit is operatively connected to the press and is open to allow a recirculating flow of lubricant to access the clutch/brake unit. The recirculating flow of lubricant comprises press lubricant.

A second bronze bushing is connected to the press and further rotatably supports the driveshaft. A ball bearing is provided and rotatably supports the outboard side of the flywheel. A flywheel quill bushing is affixed to the flywheel and is rotatably supported by the quill. The flywheel quill bushing supports the inboard side of the flywheel and allows the flywheel to rotate relative to the quill. A press lubricant reservoir maintains a supply of press lubricant and supplies press lubricant to a pressurization device which is in fluid communication with the press lubricant reservoir. The pressurization device pressurizes press lubricant and supplies the pressurized press lubricant to a first lubricant port within the quill. The second bronze bushing has a radially inward portion and a radially outward portion. The radially outward portion of the second bronze bushing is in direct fluid communication with the first quill lubricant port. The first quill lubricant port supplies press lubricant (i.e. the recirculating flow of lubricant) to the radially outward portion of the second bronze bushing. The quill has a second lubricant port which is in direct fluid communication with the flywheel quill bushing. In this way, the second quill lubricant port distributes the recirculating flow of lubricant to the flywheel quill bushing. The second bronze bushing additionally includes a lubricant access which is in fluid communication with the first quill lubricant port and the radially inward portion of the second bronze bushing. The lubricant access distributes the recirculating flow of lubricant to the radially inward portion of the second bronze bushing.

The driveshaft includes a driveshaft lubricant port which is in fluid communication with the lubricant access and an orifice. The driveshaft lubricant port distributes the recirculating flow of lubricant to the orifice and the orifice works to maintain the lubricant pressure in the second bronze bushing. The ball bearing is in fluid communication with the orifice and the recirculating flow of lubricant proceeds through the orifice and lubricates the ball bearing. The clutch/brake unit includes a clutch disc pack which is in fluid communication with the ball bearing. The recirculating flow of lubricant proceeds from the ball bearing to the clutch disc pack and from the clutch disc pack to the inside flywheel rim. The clutch/brake unit further includes a brake anchor bracket which has a first oil port and a second oil port. The clutch/brake unit includes a brake disc pack which is in fluid communication with the second quill lubricant port via the second brake anchor bracket oil port. The second brake anchor bracket oil port includes an orifice which is operative to supply lubricant to the brake disc pack while maintaining pressure in the lubricant distribution system. The brake disc pack is further in fluid communication with the inside flywheel rim. In this way, press lubricant from the press lubricant reservoir may migrate through the second orifice to the brake disc pack and finally to the inside flywheel rim. A scooper fitting which is in direct fluid communication with the inside flywheel rim and the first brake anchor bracket oil port communicates the recirculating flow of lubricant from the inside flywheel rim to the first brake anchor bracket oil port. The quill has a third lubricant port which is in direct fluid communication with the first brake anchor bracket oil port. The recirculating flow of lubricant is communicated from the first brake anchor bracket oil port to the third quill lubricant port and finally returns to the press lubricant reservoir.

The invention, in another form thereof, comprises a mechanical press which has a clutch/brake unit that selectively applies a braking action to the press driveshaft and selectively couples the press flywheel to the press driveshaft so that the press flywheel and press driveshaft are in driving relationship. The clutch/brake unit is open to allow access to a recirculating flow of lubricant which is formed of press lubricant.

The invention, in another form thereof, comprises a mechanical press which includes a drive mechanism which drives a flywheel. A quill is non-rotatably connected to the press and rotatably supports the flywheel. A first bronze bushing is connected to the press and rotatably supports a press driveshaft. A second bronze bushing is connected to the press and additionally rotatably supports the press driveshaft. A ball bearing rotatably supports the outboard side of the flywheel. A press lubricant reservoir maintains a supply of press lubricant which may be utilized to form a recirculating flow of lubricant. A pressurization device is provided and is in fluid communication with the press lubricant reservoir.

The pressurization device pressurizes lubricant and supplies the pressurized lubricant (i.e. the recirculating flow of lubricant) to a first quill lubricant port formed in the quill. The pressurization device pressurizes lubricant and supplies the pressurized lubricant (i.e. the recirculating flow of lubricant) to a press lubricant port. The press lubricant port is in fluid communication with the first bronze bushing and thus supplies the recirculating flow of lubricant to the first bronze bushing. The first bronze bushing is further in direct fluid communication with the press lubricant reservoir so that lubricant supplied to the first bronze bushing by the press lubrication port proceeds to return to the press lubricant reservoir.

A flywheel quill bushing is affixed to the flywheel and is rotatably supported by the quill. The second bronze bushing has a radially inward portion and a radially outward portion. The radially outward portion of the second bronze bushing is in direct fluid communication with the first quill lubricant port. In this way, the first quill lubricant port supplies the recirculating flow of lubricant to the radially outward portion of the second bronze bushing. The quill includes a second lubricant port which is in direct fluid communication with the flywheel quill bushing. The second quill lubricant port distributes the recirculating flow of lubricant to the flywheel quill bushing. The second bronze bushing has a lubricant access which is in fluid communication with the first quill lubricant port and the radially inward portion of the second bronze bushing so that the lubricant access distributes the recirculating flow of lubricant to the radially inward portion of the second bronze bushing. The lubricant access is further in fluid communication with a driveshaft lubricant port. The driveshaft lubricant port is additionally in fluid communication with an orifice. The driveshaft lubricant port works to distribute the recirculating flow of lubricant to the orifice. The orifice maintains the lubricant pressure in the second bronze bushing. The ball bearing is in fluid communication with the orifice so that the recirculating flow of lubricant proceeds through the orifice and lubricates the ball bearing. The clutch disc pack is in fluid communication with the ball bearing so that the recirculating flow of lubricant proceeds from the ball bearing to the clutch disc pack and from the clutch disc pack to the flywheel inside rim.

The brake anchor bracket has a first oil port and a second oil port. The second quill lubricant port supplies pressurized lubricant to the second brake anchor bracket oil port. The second brake anchor bracket oil port includes an orifice which is operative to supply lubricant to the brake disc pack while maintaining pressure in the lubricant distribution system. The brake disc pack is further in fluid communication with the inside flywheel rim. In this way, pressurized press lubricant from the press lubrication system may migrate through the second brake anchor bracket oil port and associated orifice to the brake disc pack and finally to the inside flywheel rim. A scooper fitting is provided and is in direct fluid communication with the inside flywheel rim and the first brake anchor bracket oil port. The scooper fitting works to communicate the recirculating flow of lubricant from the inside flywheel rim to the first brake anchor bracket oil port. The first brake anchor bracket oil port is connected to a third quill lubricant port contained within the quill. The recirculating flow of lubricant is communicated from the first brake anchor bracket oil port to the third quill lubricant port and finally returned to the press lubricant reservoir.

An advantage of the present invention is the ability to provide a wet clutch/brake assembly which utilizes a recirculating flow of lubricant formed from the press lubricant contained within a mechanical press.

Another advantage of the present invention is that the recirculating flow of lubricant removes the heat generated during starting and stopping of the mechanical press. Since the recirculating flow of lubricant returns to the press reservoir, the current invention advantageously utilizes the entire press frame as a large heat sink to cool the oil.

An additional advantage is that an external heat exchanger can be included into the press lube system to more effectively cool the wet clutch/brake unit and allow higher clutch actuations per minute.

A further advantage of the present invention is that higher clutch actuations per minute can be tolerated due to the more effective cooling of the recirculating flow of lubricant.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
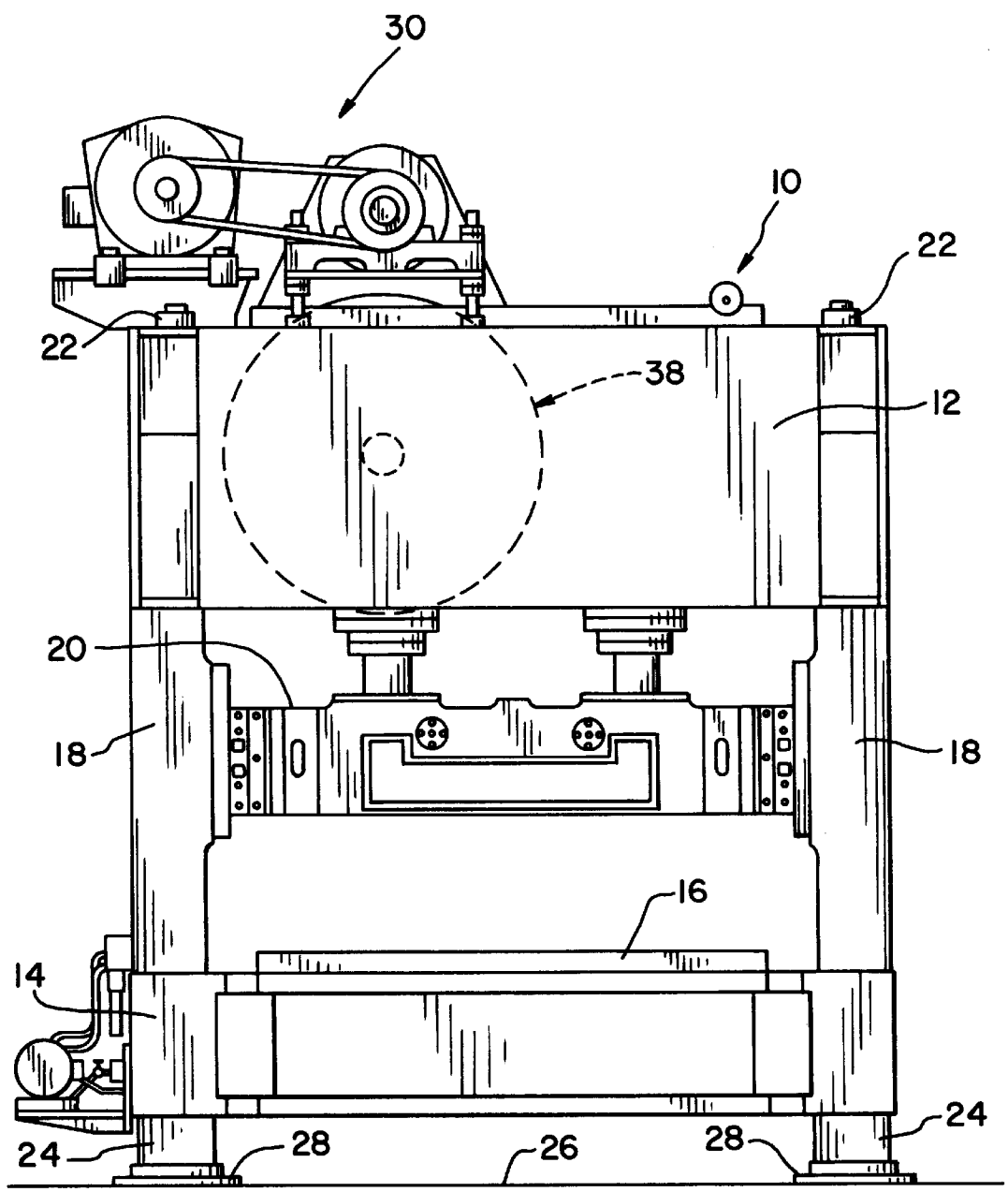
FIG. 1 is an elevational view of a press incorporating one form of the present invention.

Referring now to the drawings and particularly to FIG. 1, there is shown a mechanical press 10 including crown 12, bed 14 having bolster assembly 16 connected thereto and uprights 18 connecting crown 12 with bed 14. Uprights 18 are connected to or integral with the underside of crown 12 and the upper side of bed 14. A slide 20 is positioned between uprights 18 for reciprocating movement. Tie rods (not shown), extending through crown 12, uprights 18 and bed 14 are attached at each end with tie rod nuts 22. Leg members 24 are formed as an extension of bed 14 and are mounted on shop floor 26 by means of shock absorbing pads 28. Drive mechanism 30 is operatively connected to mechanical press 10 and imparts rotational energy to flywheel 42 (FIG. 2).

Figure 2:
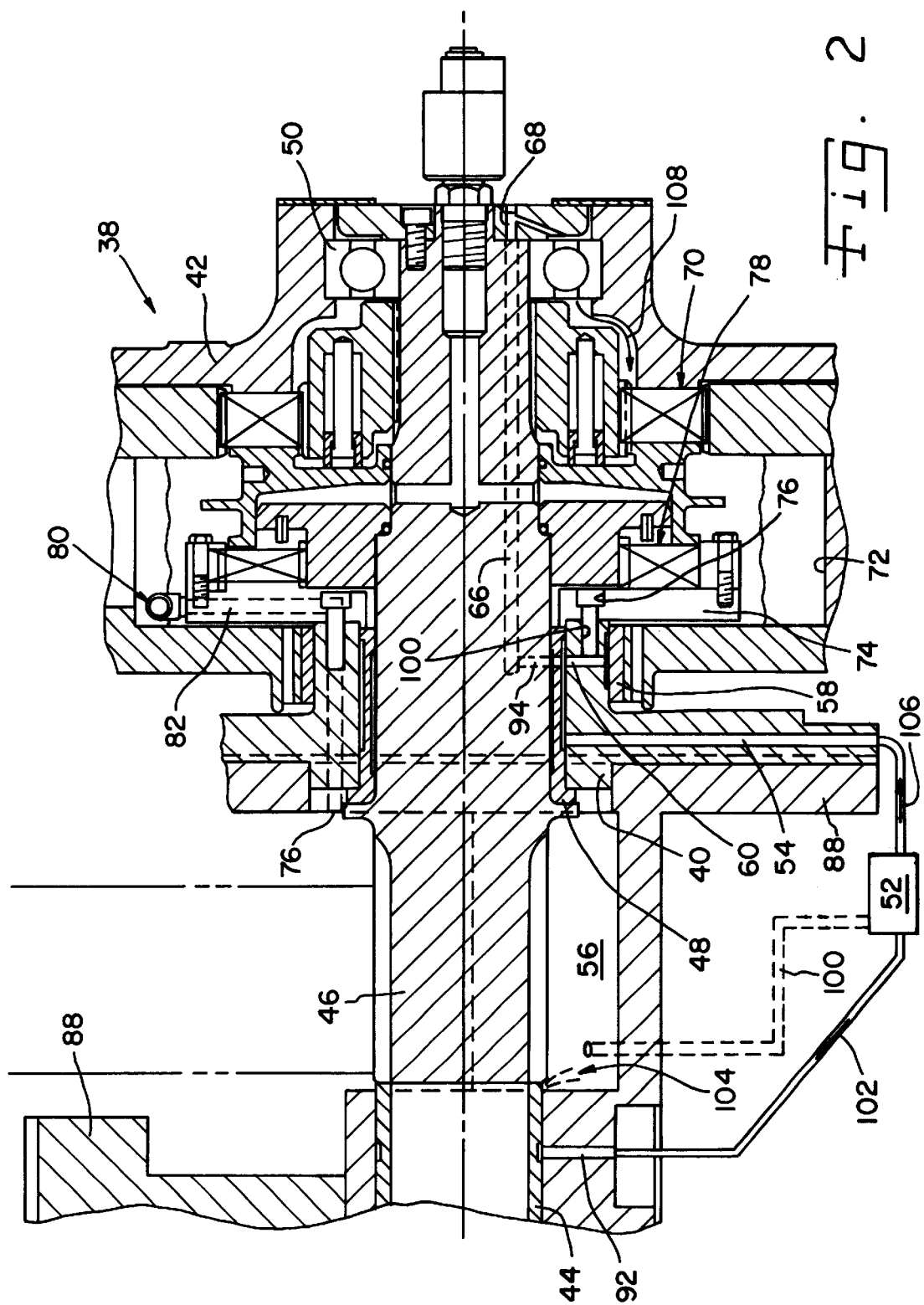
FIG. 2 is a sectional view of the wet clutch/brake assembly of one form of the present invention.

FIG. 2 illustrates a wet clutch/brake unit 38 having flywheel 42 disposed about driveshaft 46. Wet clutch/brake unit 38 (FIG. 1) alternatively applies a braking action to driveshaft 46 or couples flywheel 42 and driveshaft 46 in driving relationship. Wet clutch/brake unit 38 is open and allows a recirculating flow of lubricant to enter wet clutch/brake unit 38 and cool the component parts of wet clutch/brake unit 38. The recirculating flow of lubricant generally comprises press lubricant, but could be formed from lubricant other than press lubricant.

FIG. 2 illustrates an embodiment of the wet clutch/brake of the current invention. First bronze bushing 44 is connected to press frame 88. Driveshaft 46 is rotatably supported by first bronze bushing 44. Quill 40 is non-rotatably connected to press frame 88. Second bronze bushing 48 is connected to press frame 88 by way of quill 40. Second bronze bushing 48 additionally rotatably supports driveshaft 46. Flywheel quill bushing 58 is affixed to the inboard side of flywheel 42 and is rotatably supported by quill 40. Ball bearing 50 rotatably supports the outboard side of flywheel 42.

Press lubricant reservoir 56 maintains a supply of press lubricant and is in fluid communication with pressurization device 52, as schematically indicated in phantom by illustrative fluid connection 100. Pressurization device 52 pressurizes lubricant from press lubricant reservoir 56 and communicates the thusly pressurized lubricant (shown illustratively as fluid flow 102) to press lubricant port 92. Press lubricant port 92 allows pressurized lubricant from pressurization device 52 to travel through press frame 88 and first bronze bushing 44 to the radially inward portion of first bronze bushing 44. In this way, an oil film is formed between driveshaft 46 and first bronze bushing 44. As illustrated, oil exiting the area between driveshaft 46 and first bronze bushing 44 (shown illustratively at 104) returns to press lubricant reservoir 56.

Pressurization device 52 is in fluid communication with press lubricant reservoir 56. Pressurization device 52 pressurizes lubricant and communicates the thusly pressurized lubricant (shown illustratively as fluid flow 106) to first quill lubricant port 54. First quill lubricant port 54 allows pressurized press lubricant from pressurization device 52 to travel through quill 40 to the radially outward portion of second bronze bushing 48 and subsequently through second quill lubricant port 60 to the radially inside portion of flywheel quill bushing 58 so that an oil film is developed between flywheel quill bushing 58 and quill 40. Second quill lubricant port 60 additionally supplies pressurized lubricant from pressurization device 52 to the radially inward portion of second bronze bushing 48 so that an oil film is developed between the radially inward portion of second bronze bushing 48 and driveshaft 46. Pressurized oil from second quill lubricant port 60 is further communicated to driveshaft lubricant port 66. Second bronze bushing 48 includes lubricant access 94. Lubricant access 94 provides for fluid communication between second quill lubricant port 60 and driveshaft lubricant port 66. Orifice 68 is connected to driveshaft lubricant port 66 and maintains the oil pressure in second bronze bushing 48.

Ball bearing 50 is in fluid communication with orifice 68. The pressurized recirculating flow of lubricant proceeds through orifice 68 and lubricates ball bearing 50. Ball bearing 50 is in fluid communication with clutch disc pack 70 so that the recirculating flow of lubricant lubricates ball bearing 50 and then proceeds to clutch disc pack 70 in the form of illustrative fluid flow 108. The recirculating flow of lubricant works to cool clutch disc pack 70 and proceeds from clutch disc pack 70 to inside flywheel rim 72.

Quill 40 includes second quill lubricant port 60. Second quill lubricant port 60 is in fluid communication with second brake anchor bracket oil port 76. Second brake anchor bracket oil port 76 is contained within brake anchor bracket 74 and includes orifice 100. Second quill lubricant port 60, orifice 100 and second brake anchor bracket oil port 76 allow press lubricant from pressurized press lubricant supply 52 to migrate through second quill lubricant port 60, orifice 100 and second brake anchor bracket oil port 76 to brake disc pack 78. The press lubricant thusly communicated cools brake disc pack 78 and subsequently, proceeds to inside flywheel rim 72.

Scooper fitting 80 is connected to brake anchor bracket 74. Scooper fitting 80 is in direct fluid communication with inside flywheel rim 72 and first brake anchor bracket oil port 82. Scooper fitting 80 "scoops" oil from inside flywheel rim 72 and communicates this oil to first brake anchor bracket oil port 82. Scooper fittings are provided in one direction of rotation so that the wet clutch/brake recirculating lubricant system of the current invention will function in one direction of rotation. Recirculating press lubricant communicated from scooper fitting 80 to first brake anchor bracket oil port 82 returns to press lubricant reservoir 56.

In operation, a recirculating flow of press lubricant lubricates and cools the clutch/brake unit as well as lubricating the bronze bushings which support the driveshaft, and the bronze bushing and ball bearing which support the flywheel. As depicted in FIG. 2, rotary union 96 is connected to an air supply (not shown) which actuates the illustrated pneumatic clutch/brake assembly. Recirculating oil which is returned to press lubricant reservoir 56 is cooled, utilizing the entire press frame as a heat sink. An external oil cooling heat exchanger may also be utilized.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A mechanical press including press lubricant, said mechanical press comprising:
   a drive mechanism;
   a quill non-rotatably connected to the press;
   a flywheel, said flywheel rotatably supported by said quill, said flywheel driven by said drive mechanism;
   a first bronze bushing connected to the press;
   a driveshaft rotatably supported by said first bronze bushing; and
   a clutch/brake unit for selectively applying a braking action to said driveshaft and for selectively coupling said flywheel and said driveshaft in driving relationship, said clutch/brake unit operatively connected to the press, said clutch/brake unit being open to allow a recirculating flow of press lubricant to access said clutch/brake unit.

2. The mechanical press as recited in claim 1, further comprising:
   a second bronze bushing connected to the press, said second bronze bushing rotatably supporting said driveshaft.

3. The mechanical press as recited in claim 2, further comprising:
   a ball bearing, said flywheel having an inboard side and an outboard side, said ball bearing rotatably supporting said outboard side of said flywheel and said driveshaft supporting said ball bearing.

4. The mechanical press as recited in claim 3, further comprising:
   a press lubricant reservoir, said press lubricant reservoir maintaining a supply of the press lubricant; and
   a pressurization device for pressurizing lubricant, said pressurization device in fluid communication with said press lubricant reservoir, said quill having a first lubricant port, said first quill lubricant port in fluid communication with said pressurization device, wherein said pressurization device supplies said recirculating flow of lubricant to said first quill lubricant port.

5. The mechanical press as recited in claim 4, further comprising:
   a flywheel quill bushing, said flywheel quill bushing affixed to said flywheel, said flywheel quill bushing rotatably supported by said quill, said second bronze bushing having a radially inward portion and a radially outward portion, said radially outward portion of said second bronze bushing in direct fluid communication with said first quill lubricant port, wherein said first quill lubricant port supplies said recirculating flow of lubricant to said radially outward portion of said second bronze bushing, said quill having a second lubricant port, said second quill lubricant port in direct fluid communication with said flywheel quill bushing, wherein said second quill lubricant port distributes said recirculating flow of lubricant to said flywheel quill bushing, said second bronze bushing having a lubricant access, said lubricant access in fluid communication with said first quill lubricant port and said radially inward portion of said second bronze bushing, wherein said lubricant access distributes said recirculating flow of lubricant to said radially inward portion of said second bronze bushing.

6. The mechanical press as recited in claim 5, further comprising:
   an orifice, said driveshaft having a driveshaft lubricant port, said driveshaft lubricant port in fluid communication with said lubricant access and said orifice, wherein said driveshaft lubricant port distributes said recirculating flow of lubricant to said orifice, whereby said orifice maintains the lubricant pressure in said second bronze bushing, said ball bearing in fluid communication with said orifice, whereby said recirculating flow of lubricant proceeds through said orifice and lubricates said ball bearing.

7. The mechanical press as recited in claim 6, wherein said clutch/brake unit comprises:
   a clutch disc pack, said clutch disc pack in fluid communication with said ball bearing, wherein said recirculating flow of lubricant proceeds from said ball bearing to said clutch disc pack, said flywheel having an inside flywheel rim, said inside flywheel rim in fluid communication with said clutch disc pack, wherein said recirculating flow of lubricant proceeds from said clutch disc pack to said inside flywheel rim;
   a brake anchor bracket having a first oil port and a second oil port, said second brake anchor bracket oil port in fluid communication with said second quill lubricant port;
   a second orifice, said second orifice operatively connected to said second brake anchor bracket oil port, whereby said second orifice maintains the lubricant pressure in said second bronze bushing; and
   a brake disc pack, said brake disc pack in fluid communication with said second orifice and said inside flywheel rim, whereby press lubricant from said press lubricant reservoir may migrate through said second orifice to said brake disc pack and finally to said inside flywheel rim.

8. The mechanical press as recited in claim 7, further comprising:
   a scooper fitting, said scooper fitting in direct fluid communication with said inside flywheel rim and said first brake anchor bracket oil port, said scooper fitting communicating said recirculating flow of lubricant from said inside flywheel rim to said first brake anchor bracket oil port, said quill having a third lubricant port, said third quill lubricant port in direct fluid communication with said first brake anchor bracket oil port, wherein said recirculating flow of lubricant is communicated from said first brake anchor bracket oil port to said third quill lubricant port and finally to said press lubricant reservoir.

9. A mechanical press including a drive mechanism, press lubricant, a quill non-rotatably connected to the press, a flywheel, the flywheel rotatably supported by the quill, the flywheel driven by the drive mechanism, a driveshaft rotatably supported by the press, said mechanical press comprising:
   a clutch/brake unit for selectively applying a braking action to the driveshaft and for selectively coupling the flywheel and the driveshaft in driving relationship, said clutch/brake unit being open to allow access to a recirculating flow of lubricant, wherein said recirculating flow of lubricant comprises press lubricant; and a first bronze bushing connected to the press, said first bronze bushing rotatably supporting the driveshaft.

10. The mechanical press as recited in claim 9, further comprising:

a second bronze bushing connected to the press, said second bronze bushing rotatably supporting said driveshaft.

11. The mechanical press as recited in claim 10, further comprising:

a ball bearing, the flywheel having an inboard side and an outboard side, said ball bearing rotatably supporting said outboard side of the flywheel.

12. The mechanical press as recited in claim 11, further comprising:

a press lubricant reservoir, said press lubricant reservoir maintaining a supply of the press lubricant; and a pressurization device for pressurizing lubricant, said pressurization device in fluid communication with said press lubricant reservoir, the quill having a first lubricant port, said first quill lubricant port in fluid communication with said pressurization device, wherein said pressurization device supplies said recirculating flow of lubricant to said first quill lubricant port; and a flywheel quill bushing, said flywheel quill bushing affixed to the flywheel, said flywheel quill bushing rotatably supported by the quill, said second bronze bushing having a radially inward portion and a radially outward portion, said radially outward portion of said second bronze bushing in direct fluid communication with said first quill lubricant port, wherein said first quill lubricant port supplies said recirculating flow of lubricant to said radially outward portion of said second bronze bushing, the quill having a second lubricant port, said second quill lubricant port in direct fluid communication with said flywheel quill bushing, wherein said second quill lubricant port distributes said recirculating flow of lubricant to said flywheel quill bushing, said second bronze bushing having a lubricant access, said lubricant access in fluid communication with said first quill lubricant port and said radially inward portion of said second bronze bushing, wherein said lubricant access distributes said recirculating flow of lubricant to said radially inward portion of said second bronze bushing.

13. The mechanical press as recited in claim 12, further comprising:

an orifice, the driveshaft having a driveshaft lubricant port, said driveshaft lubricant port in fluid communication with said lubricant access and said orifice, wherein said driveshaft lubricant port distributes said recirculating flow of lubricant to said orifice, whereby said orifice maintains the lubricant pressure in said second bronze bushing, said ball bearing in fluid communication with said orifice, whereby said recirculating flow of lubricant proceeds through said orifice and lubricates said ball bearing.

14. The mechanical press as recited in claim 13, wherein said clutch/brake unit comprises:

a clutch disc pack, said clutch disc pack in fluid communication with said ball bearing, wherein said recirculating flow of lubricant proceeds from said ball bearing to said clutch disc pack, the flywheel having an inside flywheel rim, said inside flywheel rim in fluid communication with said clutch disc pack, wherein said recirculating flow of lubricant proceeds from said clutch disc pack to said inside flywheel rim;

a brake anchor bracket having a first oil port and a second oil port, said second brake anchor bracket oil port in fluid communication with said second quill lubricant port;

a second orifice, said second orifice operatively connected to said second brake anchor bracket oil port, whereby said second orifice maintains the lubricant pressure in said second bronze bushing; and a brake disc pack, said brake disc pack in fluid communication with said second orifice and said inside flywheel rim, whereby press lubricant from said press lubricant reservoir may migrate through said second orifice to said brake disc pack and finally to said inside flywheel rim.

15. The mechanical press as recited in claim 14, further comprising:

a scooper fitting, said scooper fitting in direct fluid communication with said inside flywheel rim and said first brake anchor bracket oil port, said scooper fitting communicating said recirculating flow of lubricant from said inside flywheel rim to said first brake anchor bracket oil port, the quill having a third lubricant port, said third quill lubricant port in direct fluid communication with said first brake anchor bracket oil port, wherein said recirculating flow of lubricant is communicated from said first brake anchor bracket oil port to said third quill lubricant port and finally to said press lubricant reservoir.

16. A mechanical press including press lubricant, said mechanical press comprising:

a drive mechanism;

a quill non-rotatably connected to the press;

a flywheel, said flywheel rotatably supported by said quill, said flywheel driven by said drive mechanism;

a first bronze bushing connected to the press;

a driveshaft rotatably supported by said first bronze bushing;

a second bronze bushing connected to the press, said second bronze bushing rotatably supporting said driveshaft;

a ball bearing, said flywheel having an inboard side and an outboard side, said ball bearing rotatably supporting said outboard side of said flywheel and said driveshaft supporting said ball bearing;

a press lubricant reservoir, said press lubricant reservoir maintaining a supply of the press lubricant;

a recirculating flow of lubricant, said recirculating flow of lubricant comprising press lubricant;

a pressurization device for pressurizing lubricant, said pressurization device in fluid communication with said press lubricant reservoir, said quill having a first lubricant port, said first quill lubricant port in fluid communication with said pressurization device, wherein said first pressurization device supplies said recirculating flow of lubricant to said first quill lubricant port;

a press lubricant port, said press lubricant port in fluid communication with said pressurization device, wherein said pressurization device supplies said recirculating flow of lubricant to said press lubricant port, said press lubricant port in fluid communication with said first bronze bushing, whereby said press lubricant port supplies said recirculating flow of lubricant to said first bronze bushing, said first bronze bushing in direct fluid communication with said press lubricant reservoir, whereby lubricant supplied to said first bronze bushing by said press lubricant port proceeds to said press lubricant reservoir;

a flywheel quill bushing, said flywheel quill bushing affixed to said flywheel, said flywheel quill bushing rotatably supported by said quill, said second bronze bushing having a radially inward portion and a radially outward portion, said radially outward portion of said second bronze bushing in direct fluid communication with said first quill lubricant port, wherein said first quill lubricant port supplies said recirculating flow of lubricant to said radially outward portion of said second bronze bushing, said quill having a second lubricant port, said second quill lubricant port in direct fluid communication with said flywheel quill bushing, wherein said second quill lubricant port distributes said recirculating flow of lubricant to said flywheel quill bushing, said second bronze bushing having a lubricant access, said lubricant access in fluid communication with said first quill lubricant port and said radially inward portion of said second bronze bushing, wherein said lubricant access distributes said recirculating flow of lubricant to said radially inward portion of said second bronze bushing;

an orifice, said driveshaft having a driveshaft lubricant port, said driveshaft lubricant port in fluid communication with said lubricant access and said orifice, wherein said driveshaft lubricant port distributes said recirculating flow of lubricant to said orifice, whereby said orifice maintains the lubricant pressure in said second bronze bushing, said ball bearing in fluid communication with said orifice, whereby said recirculating flow of lubricant proceeds through said orifice and lubricates said ball bearing;

a clutch disc pack, said clutch disc pack in fluid communication with said ball bearing, wherein said recirculating flow of lubricant proceeds from said ball bearing to said clutch disc pack, said flywheel having an inside flywheel rim, said inside flywheel rim in fluid communication with said clutch disc pack, wherein said recirculating flow of lubricant proceeds from said clutch disc pack to said inside flywheel rim;

a brake anchor bracket having a first oil port and a second oil port, said second brake anchor bracket oil port in fluid communication with said second quill lubricant port;

a second orifice, said second orifice operatively connected to said second brake anchor bracket oil port, whereby said second orifice maintains the lubricant pressure in said second bronze bushing;

a brake disc pack, said brake disc pack in fluid communication with said second orifice and said inside flywheel rim, whereby press lubricant from said press lubricant reservoir may migrate through said second orifice to said brake disc pack and finally to said inside flywheel rim; and a scooper fitting, said scooper fitting in direct fluid communication with said inside flywheel rim and said first brake anchor bracket oil port, said scooper fitting communicating said recirculating flow of lubricant from said inside flywheel rim to said first brake anchor bracket oil port, said quill having a third lubricant port, said third quill lubricant port in direct fluid communication with said first brake anchor bracket oil port, wherein said recirculating flow of lubricant is communicated from said first brake anchor bracket oil port to said third quill lubricant port and finally to said press lubricant reservoir.

* * * * *